(12) United States Patent
Maeda et al.

(10) Patent No.: US 11,192,573 B2
(45) Date of Patent: Dec. 7, 2021

(54) STEERING COLUMN APPARATUS

(71) Applicant: JTEKT CORPORATION, Osaka (JP)

(72) Inventors: Seigi Maeda, Gamagori (JP); Kenta Takai, Nagoya (JP); Satoki Yoshimura, Hamamatsu (JP); Yoshinori Hakamata, Eskilstuna (SE)

(73) Assignee: JTEKT CORPORATION, Osaka (JP)

( * ) Notice: Subject to any disclaimer, the term of this patent is extended or adjusted under 35 U.S.C. 154(b) by 29 days.

(21) Appl. No.: 16/789,523

(22) Filed: Feb. 13, 2020

(65) Prior Publication Data

US 2020/0262467 A1    Aug. 20, 2020

(30) Foreign Application Priority Data

Feb. 18, 2019    (JP) .............................. JP2019-026351

(51) Int. Cl.
     *B62D 1/19*      (2006.01)
     *B62D 1/187*     (2006.01)

(52) U.S. Cl.
     CPC .............. *B62D 1/195* (2013.01); *B62D 1/187* (2013.01)

(58) Field of Classification Search
     CPC ...................................................... B62D 1/195
     See application file for complete search history.

(56) References Cited

U.S. PATENT DOCUMENTS

| | | | | |
|---|---|---|---|---|
| 9,242,667 B2 * | 1/2016 | Yoshihara | .............. | B62D 1/189 |
| 9,623,895 B2 * | 4/2017 | Johta | ....... | B62D 1/192 |
| 9,637,161 B2 * | 5/2017 | Orihara | .................. | B62D 1/195 |
| 9,994,248 B2 * | 6/2018 | Yamada | ................. | B62D 1/184 |
| 10,053,135 B2 * | 8/2018 | Sakuda | ................... | B62D 1/184 |
| 10,081,384 B2 * | 9/2018 | Tanaka | ................... | B62D 1/187 |
| 10,093,341 B2 * | 10/2018 | Johta | ....................... | B62D 1/192 |
| 10,093,343 B2 * | 10/2018 | Takahashi | ............. | B62D 1/184 |
| 10,457,315 B2 * | 10/2019 | Sakuda | ................... | B62D 1/184 |
| 10,870,443 B2 * | 12/2020 | Takahashi | ............. | B62D 1/192 |
| 2006/0163861 A1 | 7/2006 | Higashino | | |
| 2008/0087129 A1 | 4/2008 | Kaneko et al. | | |
| 2012/0318092 A1 | 12/2012 | Kuroumaru | | |

FOREIGN PATENT DOCUMENTS

| | | | |
|---|---|---|---|
| JP | S61-125963 A | | 6/1986 |
| JP | 2013-001242 A | | 1/2013 |

OTHER PUBLICATIONS

Jul. 14, 2020 Extended Search Report issued in European Patent Application No. 20157857.2.

* cited by examiner

*Primary Examiner* — Faye M Fleming
(74) *Attorney, Agent, or Firm* — Oliff PLC (57) ABSTRACT

An upper bracket of a steering column apparatus includes a vehicle body-side bracket including side plates, a tube-side bracket including side plates, and a support shaft. The vehicle body-side bracket has first coupling holes in the side plates. The tube-side bracket has second coupling holes in the side plates. The first coupling holes and the second coupling holes are configured such that the vehicle body-side bracket and the tube-side bracket are coupled together by inserting the support shaft through the first coupling holes and the second coupling holes. Each of the second coupling holes is open rearward and is configured such that, when an axial load equal to or greater than a predetermined load is applied to an upper tube, fitting between the second coupling hole and the support shaft is terminated and the tube-side bracket moves forward.

8 Claims, 6 Drawing Sheets

STEERING COLUMN APPARATUS

CROSS-REFERENCE TO RELATED APPLICATION

This application claims priority to Japanese Patent Application No. 2019-026351 filed on Feb. 18, 2019, incorporated herein by reference in its entirety.

BACKGROUND

1. Technical Field

The present disclosure relates to a steering column apparatus.

2. Description of Related Art

There is a steering column apparatus configured such that, when a vehicle comes into a frontal collision to cause a secondary collision in which a driver collides with a steering wheel due to action of inertia, the steering column apparatus absorbs an impact of the secondary collision. As described in, for example, Japanese Unexamined Patent Application Publication No. 2013-1242 (JP 2013-1242 A), in this type of steering column apparatus, the steering wheel is fixed to the rear end of a column shaft, and a column tube supports the column shaft such that the column shaft is rotatable. The column tube has a double tube structure in which an upper tube is fitted to a lower tube. An upper bracket that supports the upper tube is fixed to a vehicle body such that the upper bracket is separated from the vehicle body when an axial load equal to or greater than a predetermined load is applied to the upper tube. The impact of the secondary collision is absorbed such that the upper bracket is separated due to the secondary collision and the upper tube moves in an axial direction while sliding relative to the lower tube (hereinafter referred to as an energy absorption (EA) stroke).

After the upper bracket is separated from the vehicle body, the upper tube is no longer supported on the vehicle body. Therefore, the steering wheel may fall together with the upper tube. The steering column apparatus described in JP 2013-1242 A includes a guide member configured to keep the upper bracket fixed to the vehicle body after the upper bracket is separated and to guide movement of the upper bracket when the upper tube performs the EA stroke. The guide member prevents the steering wheel from falling together with the upper tube after the upper bracket is separated.

SUMMARY

In the structure described in JP 2013-1242 A, the guide member is separately necessary to prevent the steering wheel from falling, thereby increasing the number of components of the steering column apparatus and complicating the structure of the steering column apparatus.

The present disclosure provides a steering column apparatus in which a steering wheel can be prevented, with a simple structure, from falling even after a secondary collision.

A steering column apparatus according to an aspect of the present disclosure includes a column shaft to which a steering wheel is fixed at a rear end in a front-rear direction of a vehicle, a column tube that supports the column shaft such that the column shaft is rotatable, and an upper bracket that supports a rear part of the column tube. The column tube includes a lower tube and an upper tube fitted to the lower tube from a rear side. The upper bracket includes a vehicle body-side bracket fixed to a vehicle body and including a pair of side plates provided at a distance between the side plates in a width direction of the vehicle, a tube-side bracket fixed to the upper tube and including a pair of side plates provided at a distance between the side plates in the width direction of the vehicle, and a support shaft arranged below the upper tube. The vehicle body-side bracket has first coupling holes in the side plates. The tube-side bracket has second coupling holes in the side plates. The first coupling holes and the second coupling holes are configured such that the vehicle body-side bracket and the tube-side bracket are coupled together by inserting the support shaft through the first coupling holes and the second coupling holes. Each of the second coupling holes is open rearward and is configured such that, when an axial load equal to or greater than a predetermined load is applied to the upper tube, fitting between the second coupling hole and the support shaft is terminated and the tube-side bracket moves forward.

According to the structure described above, when a load of a secondary collision is applied to the steering wheel, the fitting between the second coupling hole and the support shaft is terminated, and the tube-side bracket is separated from the vehicle body-side bracket. Then, the upper tube performs an EA stroke. Thus, an impact of the secondary collision can be absorbed. After the tube-side bracket is separated, the vehicle body-side bracket and the support shaft remain fixed to the vehicle body. In the structure described above, the support shaft is arranged below the upper tube, and therefore the separated upper tube is supported by the support shaft. Thus, the steering wheel can be prevented from falling. Since the support shaft prevents the steering wheel from falling, an increase in the number of components can be suppressed as compared to a case where a dedicated component such as a guide member is provided separately to support the separated upper tube.

The steering column apparatus described above may be mounted on the vehicle in an inclined state such that a front end of the column tube is located below a rear end of the column tube. The vehicle body-side bracket may include a top plate extending in the front-rear direction of the vehicle and in the width direction of the vehicle, and a rear wall bent so as to extend downward from a rear end of the top plate. A facing portion bent so as to extend in an axial direction of the upper tube may be provided at a part of the rear wall that faces the upper tube.

When the steering column apparatus is mounted on the vehicle in the inclined state such that the front end is located below the rear end, the direction of the load of the secondary collision does not coincide with a direction along an axial direction of the column tube, and a component force is applied to the column tube in a direction orthogonal to the axial direction. Thus, the upper tube may collide with the vehicle body-side bracket before or after the tube-side bracket is separated. In the structure described above, the vehicle body-side bracket remains fixed to the vehicle body, and therefore the EA stroke of the upper tube may be hindered by, for example, a bend of the upper tube that collides with the vehicle body-side bracket. According to the structure described above, the facing portion is bent so as to extend in the axial direction of the upper tube. Therefore, the upper tube is likely to strike against the facing portion with some length in the axial direction. This reduces the occurrence of a case where the upper tube that strikes against the facing portion is, for example, bent at the facing portion. Thus, the EA stroke of the upper tube can be facilitated.

In the steering column apparatus described above, the vehicle body-side bracket may have a cutout portion at a part of the rear wall that is adjacent to the facing portion in the width direction of the vehicle. According to the structure described above, the strength of a connection portion between the rear wall and the facing portion decreases through the formation of the cutout portion, thereby facilitating deformation of the connection portion when the upper tube strikes against the facing portion. Deformation of the upper tube is suppressed because the connection portion between the rear wall and the facing portion is deformed first when the upper tube strikes against the facing portion. Thus, the EA stroke of the upper tube can be facilitated effectively.

In the steering column apparatus described above, the vehicle body-side bracket may have a slit in the facing portion. The slit extends in the axial direction of the upper tube. According to the structure described above, the strength of the facing portion decreases through the formation of the slit, thereby facilitating deformation of the facing portion. Deformation of the upper tube is suppressed because the facing portion is deformed first when the upper tube strikes against the facing portion. Thus, the EA stroke of the upper tube can be facilitated effectively.

In the steering column apparatus described above, the facing portion may have a curved shape conforming to an outer peripheral surface of the upper tube. The structure described above increases the contact area when the upper tube strikes against the facing portion. Therefore, deformation of the upper tube is suppressed appropriately. Thus, the EA stroke of the upper tube can be facilitated more effectively.

In the steering column apparatus described above, the vehicle body-side bracket may include a link portion. The link portion may be provided between the rear wall and the facing portion, and may be configured such that a clearance is present between the top plate and the link portion and a clearance is present between the facing portion and the link portion.

According to the structure described above, the vehicle body-side bracket is provided with the link portion having the clearances between the top plate and the link portion and between the facing portion and the link portion. It is likely that the facing portion is elastically displaced relative to the top plate. When the upper tube strikes against the facing portion, an impact is mitigated through the elastic displacement of the facing portion. Thus, it is possible to reduce the occurrence of a case where the impact caused when the upper tube strikes against the facing portion is excessively large.

According to the aspect of the present disclosure, the steering wheel can be prevented, with a simple structure, from falling even after a secondary collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A steering column apparatus according to a first embodiment is described below with reference to the drawings. In the following description, a right side in FIG. 1 is a front side of a vehicle, and a left side in FIG. 1 is a rear side of the vehicle.

Figure 1:
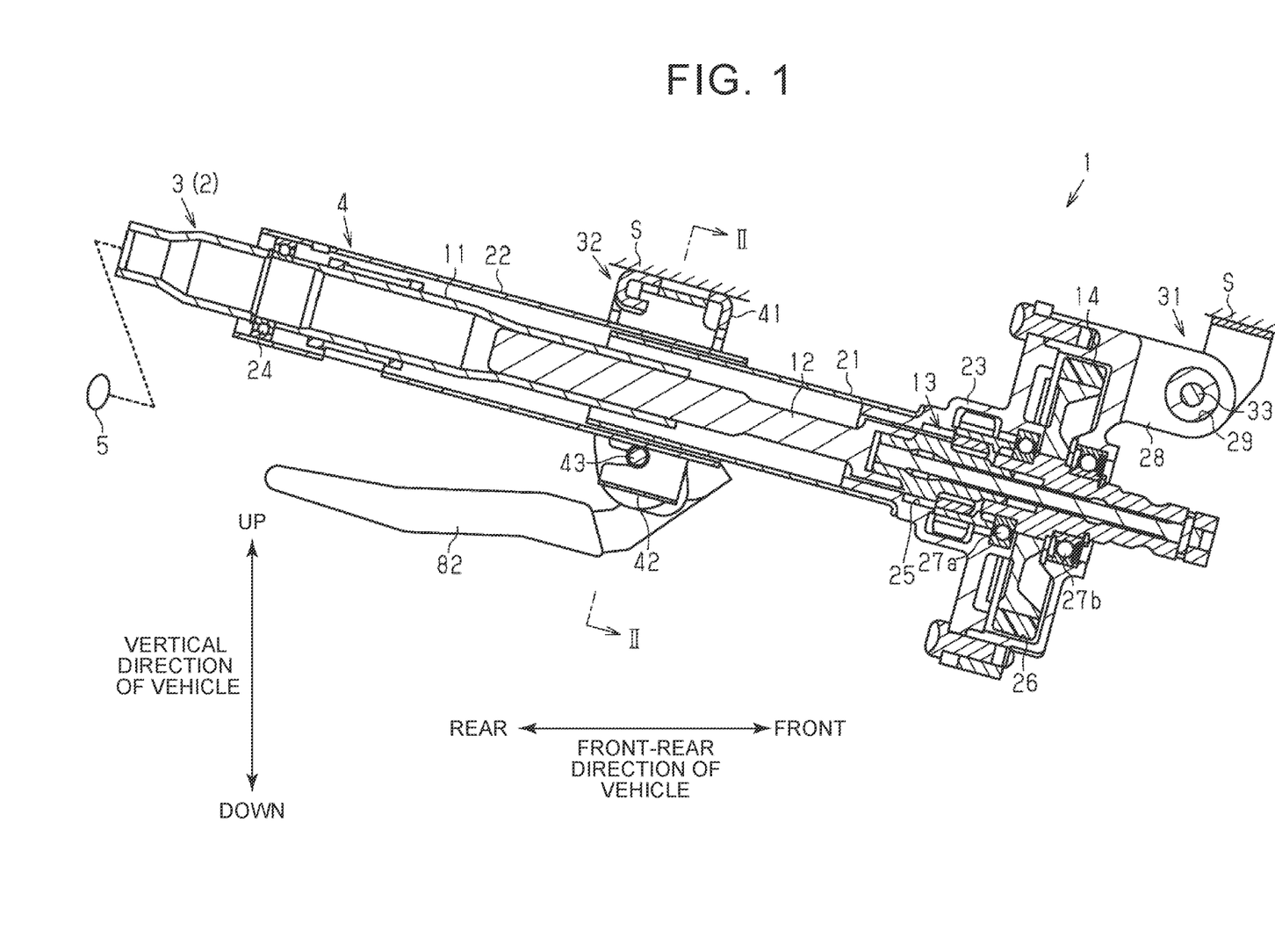
FIG. 1 is a sectional view along an axial direction, for illustrating a steering column apparatus according to a first embodiment.

As illustrated in FIG. 1, a steering column apparatus 1 includes a column shaft 3 and a column tube 4. The column shaft 3 constitutes a steering shaft 2. The column tube 4 houses the column shaft 3 such that the column shaft 3 is rotatable. A steering wheel 5 is coupled to the rear end of the column shaft 3. An intermediate shaft is coupled to the front end of the column shaft 3 via a universal joint (not illustrated). The intermediate shaft constitutes a part of the steering shaft 2. A steering angle of each steered wheel is changed by transmitting rotation of the steering shaft 2 along with a steering operation to a steering operation mechanism such as a rack and pinion mechanism. The steering column apparatus 1 is mounted on the vehicle in an inclined state such that the front ends of the column shaft 3 and the column tube 4 are located below the rear ends of the column shaft 3 and the column tube 4.

The steering column apparatus 1 has a power assist function and a tilt adjustment function. With the power assist function, an assist force for assisting a driver's steering operation is applied to the column shaft 3 by using a motor as a drive source. With the tilt adjustment function, the height position of the steering wheel 5 is adjusted.

Specifically, the column shaft 3 includes a hollow upper shaft 11 and a lower shaft 12. The steering wheel 5 is coupled to the upper shaft 11. The lower shaft 12 is spline-fitted to the upper shaft 11, and is therefore movable in an axial direction relative to the upper shaft 11. The column shaft 3 further includes a driving shaft 13 coupled to the front end of the lower shaft 12 so as to be rotatable together with the lower shaft 12. Rotation of the motor (not illustrated) is transmitted to the driving shaft 13. A worm wheel 14 is fitted to the driving shaft 13 so as to be rotatable together with the driving shaft 13. The assist force is applied such that the rotation of the motor is transmitted to a worm shaft (not illustrated) coupled to the motor and is transmitted to the driving shaft 13 via the worm wheel 14 while reducing the speed of the rotation.

The column tube 4 includes a lower tube 21 and an upper tube 22. The upper tube 22 is fitted to the lower tube 21 from the rear side. That is, the column tube 4 has a double tube structure in which two tubular members are fitted together. In this embodiment, a housing 23 is fixed to the front end of the lower tube 21. For example, the housing 23 houses a worm reducer configured to reduce the speed of the rotation of the motor.

The lower tube 21 has a cylindrical shape. The upper tube 22 has a cylindrical shape with a bore diameter and an outside diameter slightly larger than those of the lower tube 21. The front end of the upper tube 22 is fitted to the outer periphery of the rear end of the lower tube 21. The outer periphery of the front end of the upper tube is clinched to the lower tube 21. The upper tube 22 is relatively movable in the axial direction by sliding relative to the lower tube 21. The upper tube 22 supports the upper shaft 11 via a bearing 24 such that the upper shaft 11 is rotatable.

The housing 23 has an insertion hole 25 passing through the housing 23 in the axial direction. The housing 23 also has a worm wheel housing portion 26 provided coaxially with the insertion hole 25. The driving shaft 13 is inserted through the insertion hole 25. The worm wheel housing portion 26 houses the worm wheel 14. The housing 23 supports the driving shaft 13 via bearings 27a and 27b provided in the insertion hole 25 such that the driving shaft 13 is rotatable. The housing 23 has a support portion 28 supported by a lower bracket 31 described later. The support portion 28 has a shaft hole 29 passing through the support portion 28 in a width direction of the vehicle.

In the steering column apparatus 1, the housing 23 is supported by the lower bracket 31 fixed to a front part of a vehicle body S, and a rear part of the column tube 4 is supported by an upper bracket 32 fixed to a rear part of the vehicle body S. The lower bracket 31 has a tilt center shaft 33 inserted through the shaft hole 29 of the support portion 28 to support the housing 23 and the column tube 4 such that the housing 23 and the column tube 4 are tiltable about the tilt center shaft 33. The upper bracket 32 supports the column tube 4 such that the column tube 4 is tiltable about the tilt center shaft 33 within a predetermined range. The height position of the steering wheel 5 is adjusted by changing the position of the steering wheel 5 in a tilt direction that is substantially a vertical direction of the vehicle. To be exact, the height position of the steering wheel 5 is adjusted by changing the position of the steering wheel 5 in a tilt direction about the tilt center shaft 33.

Figure 2:
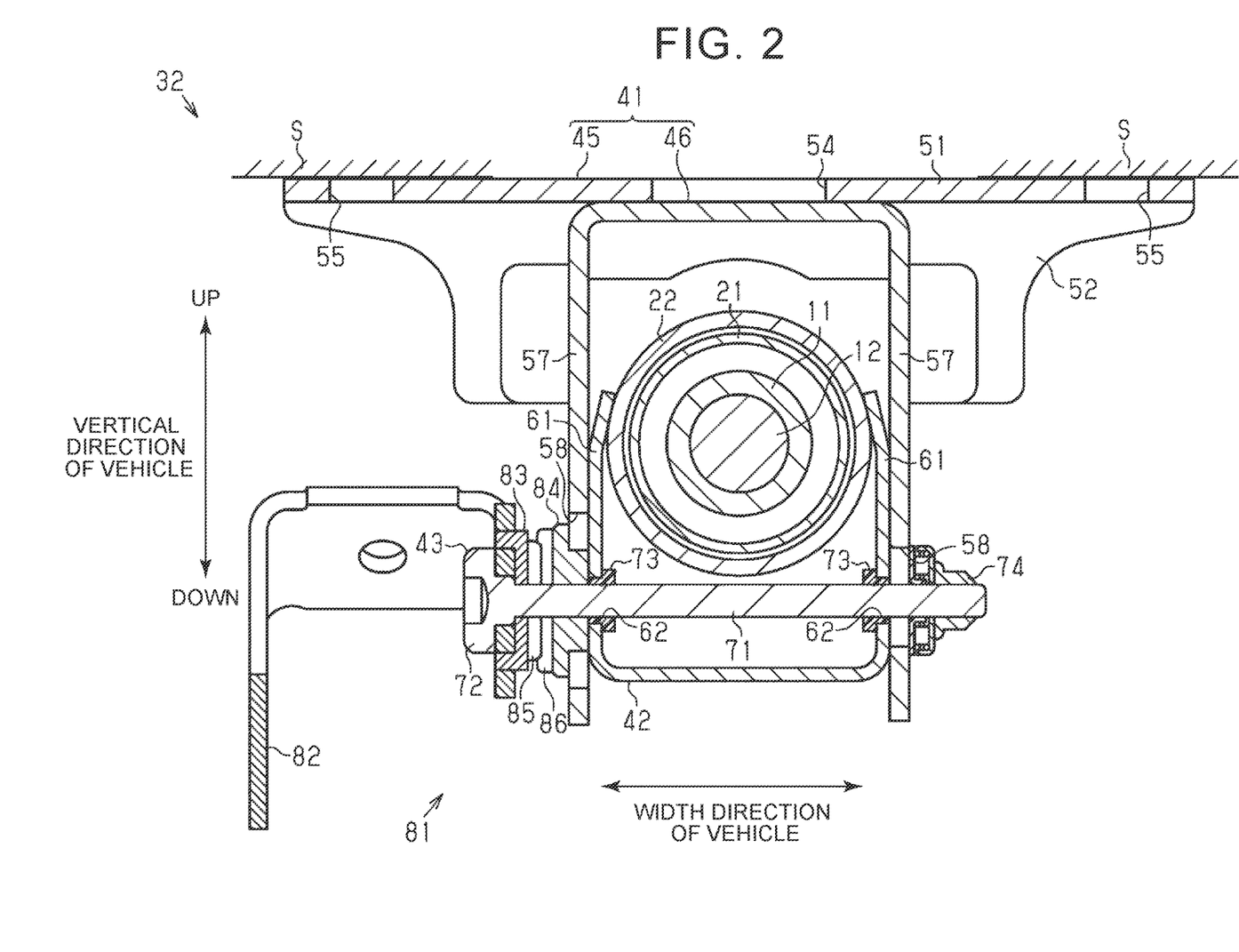
FIG. 2 is a sectional view orthogonal to the axial direction at a support shaft portion of the steering column apparatus according to the first embodiment, and is a sectional view taken along a line II-II in FIG. 1.
Figure 3:
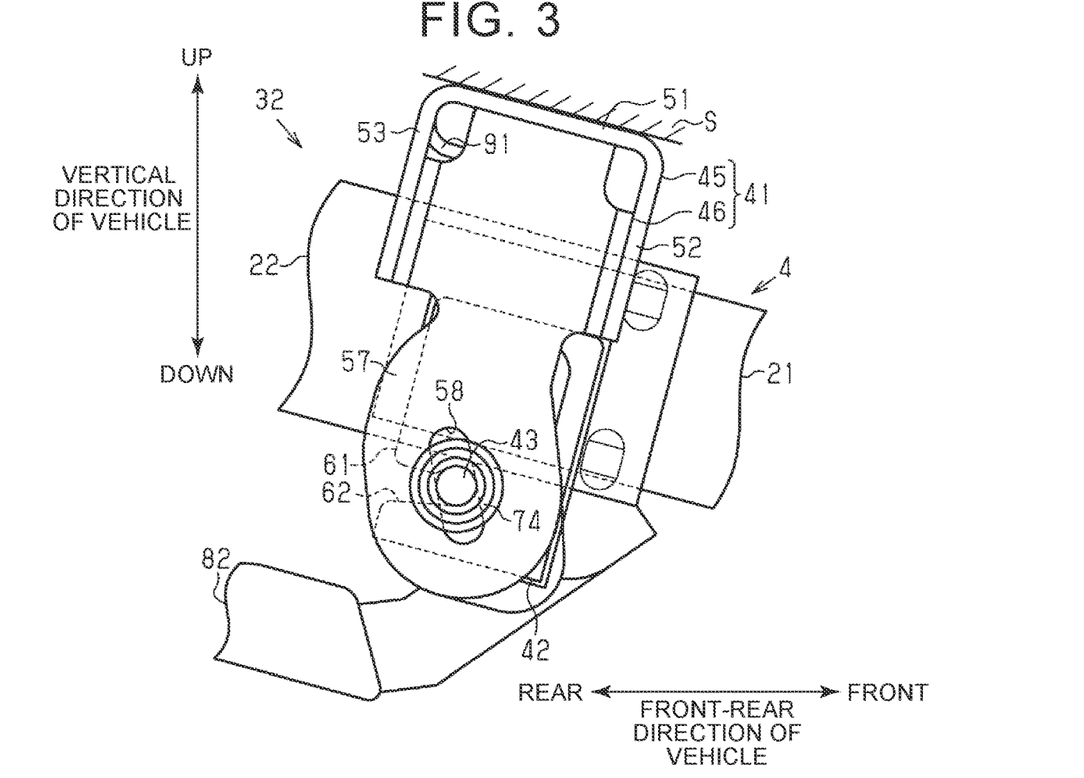
FIG. 3 is a side view of the vicinity of an upper bracket of the steering column apparatus according to the first embodiment.

Next, the structure of the upper bracket 32 is described. As illustrated in FIG. 2 and FIG. 3, the upper bracket 32 includes a vehicle body-side bracket 41, a tube-side bracket 42, and a support shaft 43. The vehicle body-side bracket 41 is fixed to the vehicle body S. The tube-side bracket 42 is fixed to the upper tube 22. The support shaft 43 is arranged below the column tube 4, and couples the vehicle body-side bracket 41 and the tube-side bracket 42 together.

The vehicle body-side bracket 41 includes a bracket body 45 and a clamp 46. The clamp 46 is fixed to a lower side of the bracket body 45. In this embodiment, the bracket body 45 and the clamp 46 are separate members joined by welding or the like.

The bracket body 45 includes a rectangular top plate 51, a front wall 52, and a rear wall 53. The top plate 51 extends in a front-rear direction of the vehicle and in the width direction of the vehicle. The front wall 52 extends downward from the front end of the top plate 51. The rear wall 53 extends downward from the rear end of the top plate 51. In this embodiment, the bracket body 45 is formed by bending a metal plate by press working or the like.

A quadrangular through hole 54 is provided in the vicinity of the center of the top plate 51 to reduce its weight. Fastening holes 55 are provided at respective ends of the top plate 51 in the width direction of the vehicle. The vehicle body-side bracket 41 is fixed to the vehicle body S with fastening bolts (not illustrated) inserted through the fastening holes 55. The bracket body 45 is fixed to the vehicle body S such that the front wall 52 is located below the rear wall 53. As described later, the rear wall 53 is provided with a facing portion 91 that faces the upper tube 22.

The clamp 46 includes a pair of side plates 57 having a substantially U-shape when viewed in an axial direction of the steering shaft 2 and arranged at a distance therebetween in the width direction of the vehicle. Each side plate 57 has an elongated first coupling hole 58 passing through the side plate 57 in the width direction of the vehicle and extending in the tilt direction.

The tube-side bracket 42 includes a pair of side plates 61 having a substantially U-shape when viewed in the axial direction of the steering shaft 2 and arranged at a distance therebetween in the width direction of the vehicle. The upper end of each side plate 61 is bent inward, and is fixed to the upper tube 22 by welding or the like. Each side plate 61 has a second coupling hole 62 passing through the side plate 61 in the width direction of the vehicle. The second coupling hole 62 slightly extends downward from the vicinity of the center of the side plate 61, then extends rearward, and is open rearward from the side plate 61.

The support shaft 43 includes a shank 71 and a head 72. The head 72 is provided at the proximal end of the shank 71. The support shaft 43 further includes a pair of collars 73 fitted to the shank 71. Each collar 73 is made of a resin material or a metal material, and has a cylindrical shape with a flange. The collars 73 are fitted to the shank 71 such that the flanges of the collars 73 face each other. The support shaft 43 is inserted through the first coupling holes 58 and the second coupling holes 62 such that the support shaft 43 is arranged below the upper tube 22 in a state in which the tube-side bracket 42 is arranged on an inner side of the clamp 46. In this state, the tubular portion of each collar 73 is press-fitted into the second coupling hole 62 with a predetermined press-fitting load. The support shaft 43 couples the vehicle body-side bracket 41 and the tube-side bracket 42 together by threadedly engaging a nut 74 with the distal end of the support shaft 43. Thus, the tube-side bracket 42 is movable in the tilt direction relative to the vehicle body-side bracket 41 within a range in which the first coupling holes 58 are provided.

As illustrated in FIG. 1 and FIG. 2, the upper bracket 32 is provided with a lock mechanism 81 configured to keep the height position of the steering wheel 5 by generating a pressing force along an axial direction of the support shaft 43 to bring the vehicle body-side bracket 41 and the tube-side bracket 42 into friction engagement with each other.

The lock mechanism 81 includes an operation lever 82, a circular first cam plate 83, and a circular second cam plate 84. The operation lever 82 is pivoted together with the support shaft 43. The first cam plate 83 and the second cam plate 84 are interposed between the head 72 and the side plate 57 of the clamp 46. Cam projections 85 and 86 are provided on facing surfaces of the first cam plate 83 and the second cam plate 84, respectively. The first cam plate 83 is fitted to the shank 71 so as to be rotatable together with the operation lever 82 and the support shaft 43 through a driver's pivoting operation for the operation lever 82. The second cam plate 84 is fitted to the shank 71 so as to be relatively rotatable about the support shaft 43.

The pivoting operation for the operation lever 82 switches a state in which the cam projections 85 and 86 of the first cam plate 83 and the second cam plate 84 ride on each other and a state in which the cam projections 85 and 86 do not ride on each other. In a locked state in which the cam projections 85 and 86 ride on each other, the side plates 57 press and squeeze the side plates 61 to reduce the distances between the side plates 57 and between the side plates 61. Relative movement between the vehicle body-side bracket 41 and the tube-side bracket 42 is restricted by a friction force applied between each side plate 57 and each side plate 61, thereby keeping the height position of the steering wheel 5.

In an unlocked state in which the cam projections 85 and 86 do not ride on each other, the side plates 57 do not press the side plates 61. In the unlocked state, the friction force applied between each side plate 57 and each side plate 61 decreases sufficiently, thereby permitting the relative movement between the vehicle body-side bracket 41 and the tube-side bracket 42. Thus, the height position of the steering wheel 5 can be adjusted.

Figure 4:
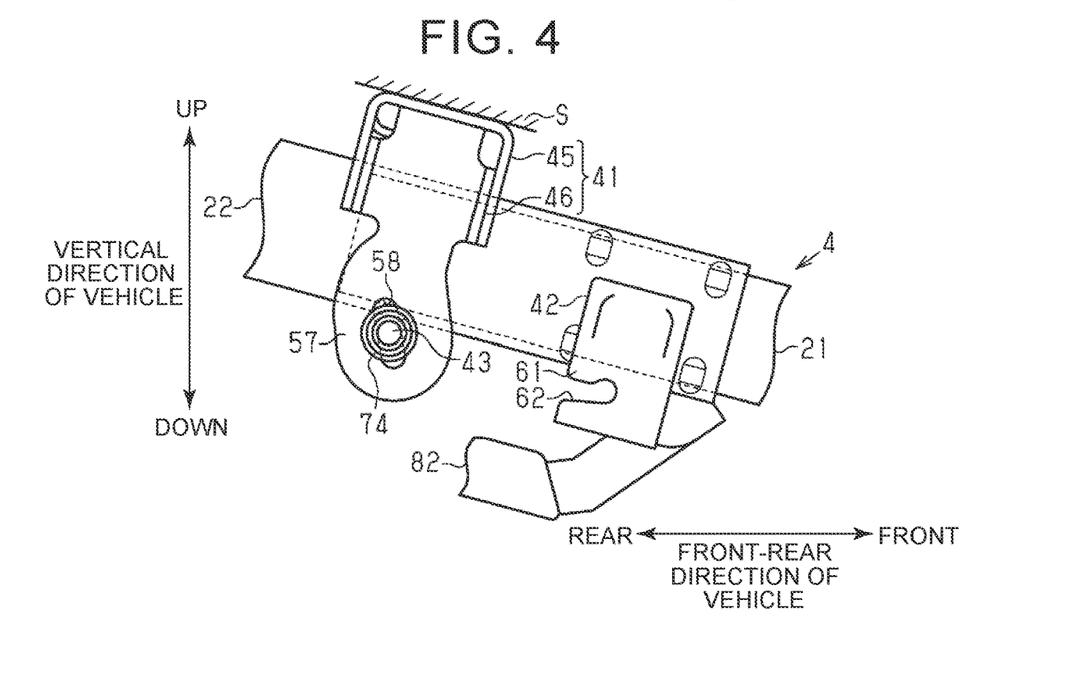
FIG. 4 is a schematic view illustrating a state in which a tube-side bracket is separated from the upper bracket according to the first embodiment.

It is assumed that the vehicle where the steering column apparatus 1 is mounted comes into a frontal collision to cause a secondary collision in which the driver collides with the steering wheel 5 due to action of inertia. When an axial load equal to or greater than a predetermined load is applied to the upper tube 22 via the steering wheel 5, the fitting between each second coupling hole 62 and each collar 73 of the support shaft 43 is terminated and the tube-side bracket 42 is separated as illustrated in FIG. 4 because the second coupling hole 62 is open rearward. At this time, an impact of the secondary collision is absorbed such that the upper tube 22 moves along the axial direction together with the tube-side bracket 42 while sliding relative to the lower tube 21 (hereinafter referred to as an EA stroke). After the tube-side bracket 42 is separated, the vehicle body-side bracket 41 and the support shaft 43 remain fixed to the vehicle body S. In the steering column apparatus 1 of this embodiment, the support shaft 43 is arranged below the upper tube 22. Therefore, the column tube 4 is supported by the support shaft 43, and is prevented from falling. The predetermined load is determined depending on, for example, a sliding resistance of the upper tube 22 to the lower tube 21, a sliding resistance of the tube-side bracket 42 to the clamp 46, and a sliding resistance of the collar 73 to the second coupling hole 62. The predetermined load is set in advance based on results of experiments or the like.

Figure 5:
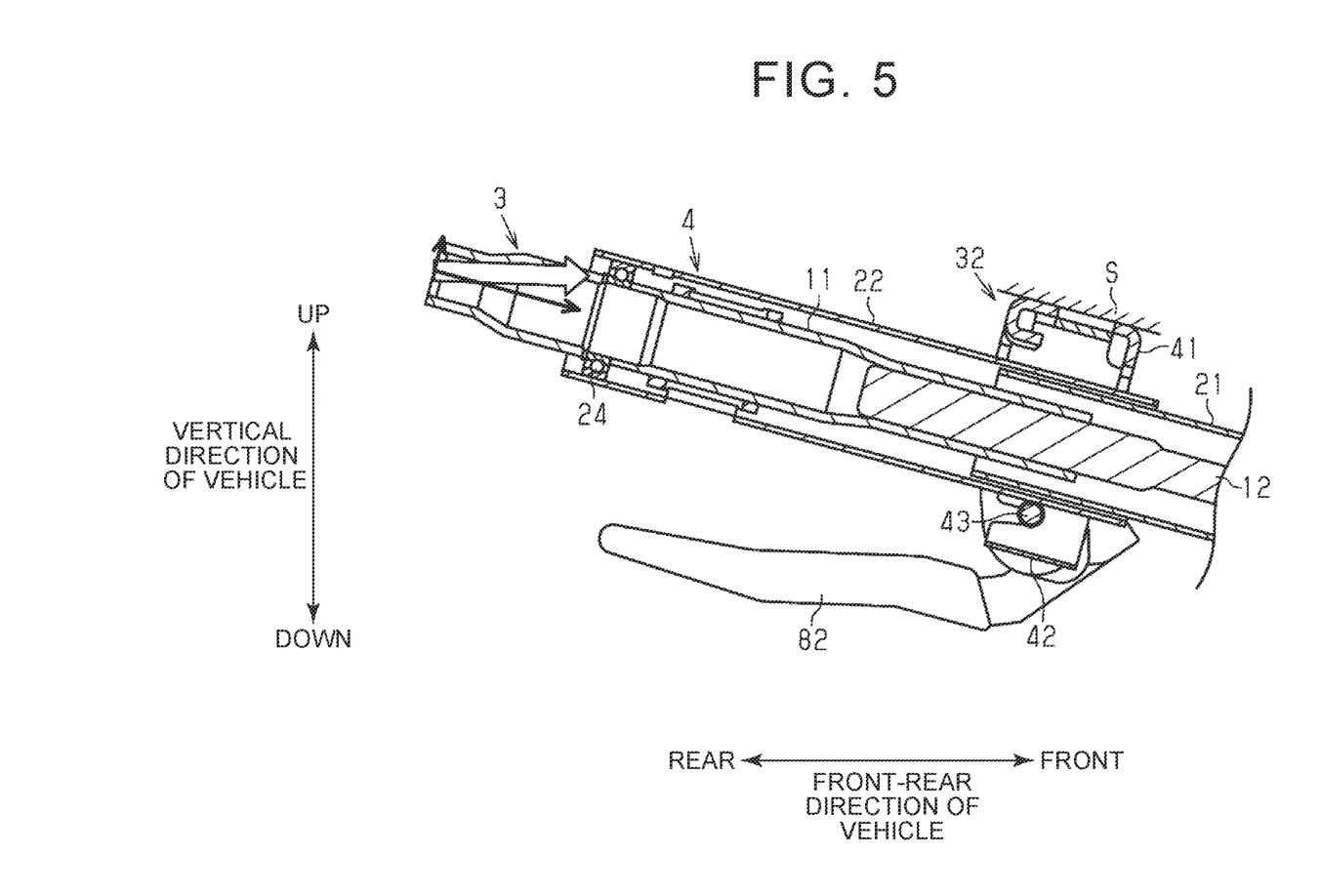
FIG. 5 is a schematic view illustrating a state in which a load of a secondary collision is applied to the steering column apparatus according to the first embodiment.

As illustrated in FIG. 5, the steering column apparatus 1 is mounted on the vehicle in the inclined state such that the front end of the column tube 4 is located below the rear end of the column tube 4. Therefore, the direction of the load of the secondary collision does not coincide with a direction along an axial direction of the column tube 4 as indicated by an outline arrow. As a result, a component force is applied to the column tube 4 in a direction orthogonal to the axial direction. Thus, the upper tube 22 may collide with the bracket body 45 of the vehicle body-side bracket 41 before or after the tube-side bracket 42 is separated. Since the vehicle body-side bracket 41 remains fixed to the vehicle body S even after the secondary collision as described above, the EA stroke of the upper tube 22 may be hindered by, for example, a bend of the upper tube 22 that collides with the vehicle body-side bracket 41.

Figure 6:
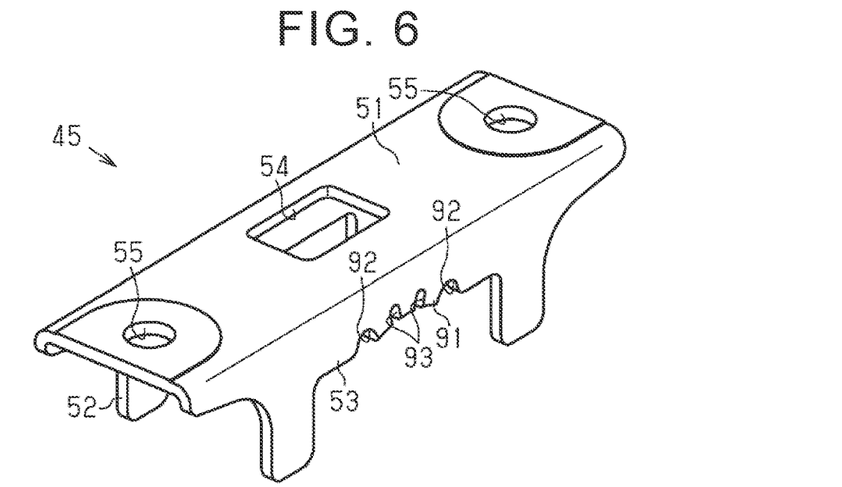
FIG. 6 is a perspective view of a bracket body of a vehicle body-side bracket according to the first embodiment.
Figure 7:
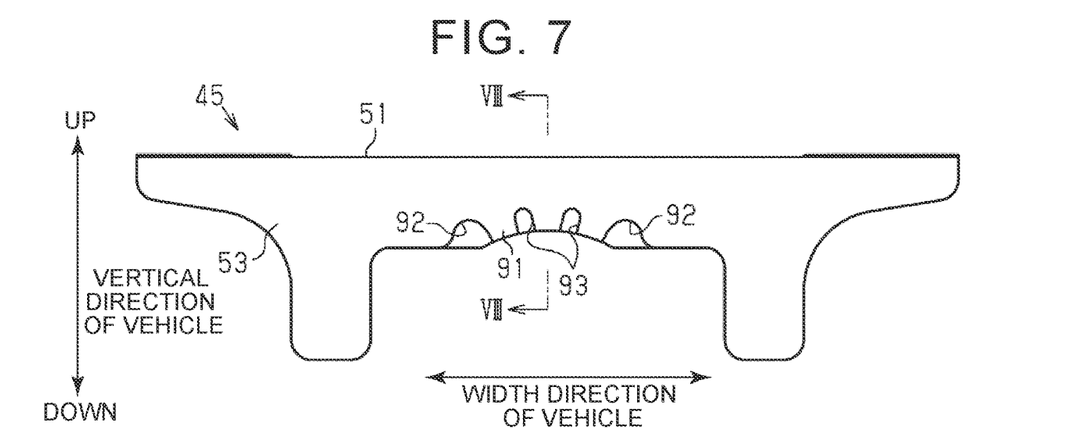
FIG. 7 is a front view of the bracket body of the vehicle body-side bracket according to the first embodiment.
Figure 8:
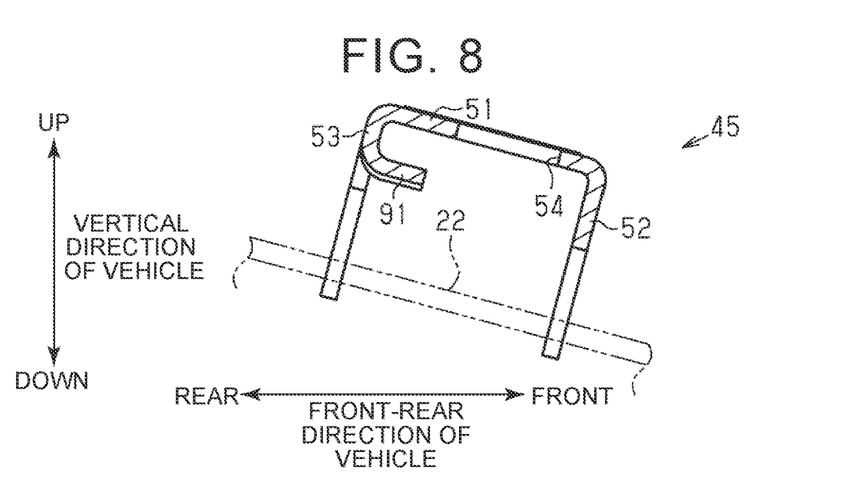
FIG. 8 is a sectional view of the bracket body of the vehicle body-side bracket according to the first embodiment, and is a sectional view taken along a line VIII-VIII in FIG. 7.

As illustrated in FIG. 6 to FIG. 8, the facing portion 91 is provided at a part of the rear wall 53 of the bracket body 45 that faces the upper tube 22. The facing portion 91 is bent so as to extend in an axial direction of the upper tube 22. Specifically, the facing portion 91 is bent substantially in parallel to the top plate 51. As described above, the upper tube 22 is tilted about the tilt center shaft 33. Therefore, the description "the facing portion 91 is bent so as to extend in the axial direction of the upper tube 22" encompasses not only a case where the extending direction of the facing portion 91 is parallel to the axial direction of the upper tube 22, but also a case where the extending direction of the facing portion 91 is inclined with respect to the axial direction of the upper tube 22. Cutout portions 92 are provided at parts of the rear wall 53 that are adjacent to respective sides of the facing portion 91 in the width direction of the vehicle. The facing portion 91 has a plurality of slits 93 extending in the axial direction of the upper tube 22. Each slit 93 extends to the front end of the facing portion 91 from a connection portion between the facing portion 91 and the rear wall 53, and is open forward. The facing portion 91 has a curved shape conforming to the outer peripheral surface of the upper tube 22. This reduces the occurrence of a case where the upper tube 22 that strikes against the facing portion 91 is, for example, bent at the facing portion 91. Thus, the EA stroke of the upper tube 22 is facilitated.

Next, actions and effects of this embodiment are described. (1) The second coupling hole 62 is open rearward from the side plate 61 and is configured such that, when an axial load equal to or greater than the predetermined load is applied to the upper tube 22, the tube-side bracket 42 moves forward to terminate the fitting between the second coupling hole 62 and the support shaft 43. When a load of a secondary collision is applied to the steering wheel 5, the tube-side bracket 42 is separated from the vehicle body-side bracket 41, and the upper tube 22 performs the EA stroke. Thus, an impact of the secondary collision can be absorbed. In this embodiment, the support shaft 43 is arranged below the upper tube 22, and therefore the separated upper tube 22 is supported by the support shaft 43. Thus, the steering wheel 5 can be prevented from falling. Since the support shaft 43 prevents the steering wheel 5 from falling, an increase in the number of components can be suppressed as compared to a case where a dedicated component such as a guide member is provided separately to support the separated upper tube 22.

(2) The bracket body 45 of the vehicle body-side bracket 41 includes the top plate 51 extending in the front-rear direction of the vehicle and in the width direction of the vehicle, and the rear wall 53 extending downward from the rear end of the top plate 51. The facing portion 91 bent so as to extend in the axial direction of the upper tube 22 is provided at the part of the rear wall 53 that faces the upper tube 22. When the upper tube 22 collides with the bracket body 45 before or after the tube-side bracket 42 is separated, the upper tube 22 is likely to strike against the facing portion 91 with some length in the axial direction. This reduces the occurrence of the case where the upper tube 22 that strikes against the facing portion 91 is, for example, bent at the facing portion 91. Thus, the EA stroke of the upper tube 22 can be facilitated.

(3) The cutout portions 92 are provided at the parts of the rear wall 53 that are adjacent to respective sides of the facing portion 91 in the width direction of the vehicle. Therefore, the strength of the connection portion between the rear wall 53 and the facing portion 91 decreases, thereby facilitating deformation of the connection portion when the upper tube 22 strikes against the facing portion 91. Deformation of the upper tube 22 is suppressed because the connection portion between the rear wall 53 and the facing portion 91 is deformed first when the upper tube 22 strikes against the facing portion 91. Thus, the EA stroke of the upper tube 22 can be facilitated effectively.

(4) The facing portion 91 has the slits 93 extending in the axial direction of the upper tube 22. Therefore, the strength of the facing portion 91 decreases, thereby facilitating deformation of the facing portion 91. Deformation of the upper tube 22 is suppressed because the facing portion 91 is deformed first when the upper tube 22 strikes against the facing portion 91. Thus, the EA stroke of the upper tube 22 can be facilitated effectively.

(5) The facing portion 91 has the curved shape conforming to the outer peripheral surface of the upper tube 22. This increases the contact area when the upper tube 22 strikes against the facing portion 91. Therefore, deformation of the upper tube 22 is suppressed appropriately. Thus, the EA stroke of the upper tube 22 can be facilitated more effectively.

Next, a steering column apparatus according to a second embodiment is described with reference to the drawings. For convenience of the description, the same components are represented by the same reference symbols as those in the first embodiment to omit their description.

Figure 9:
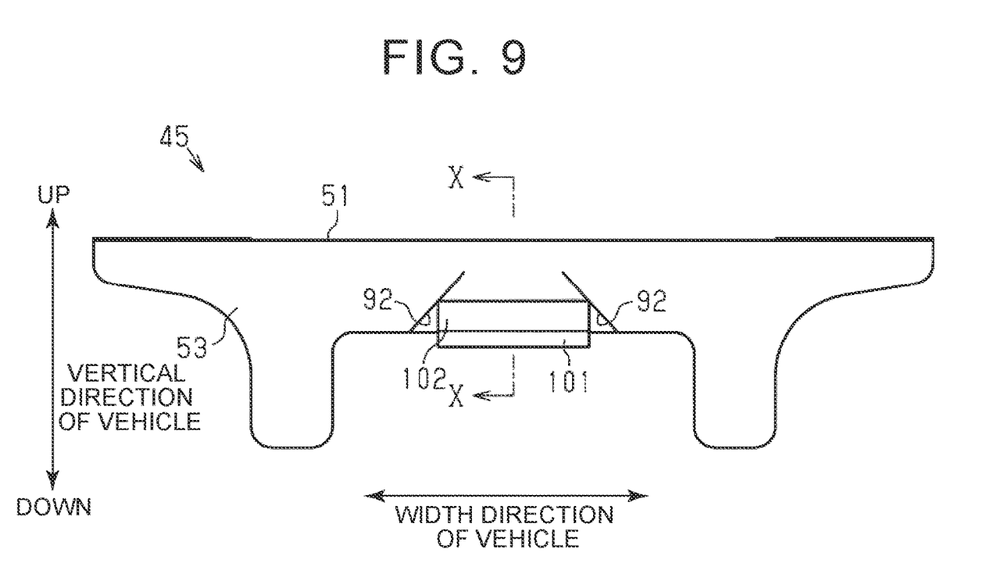
FIG. 9 is a front view of a bracket body of a vehicle body-side bracket according to a second embodiment.
Figure 10:
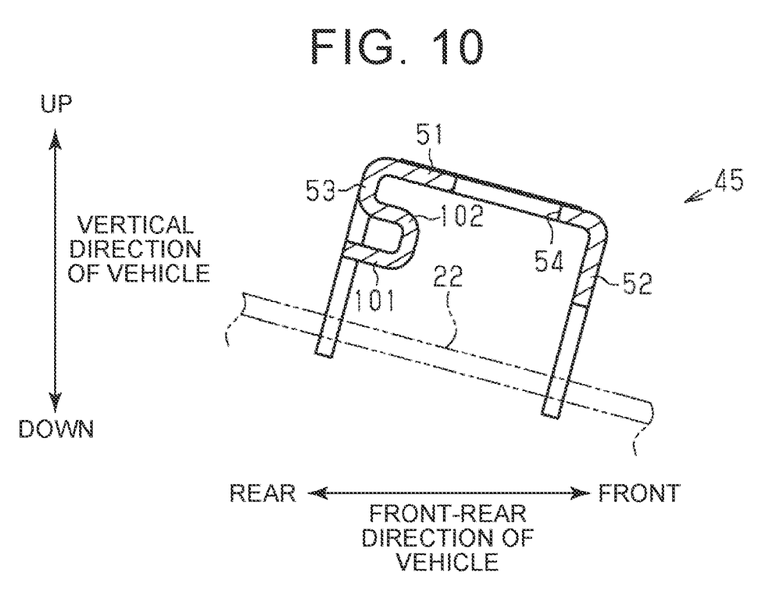
FIG. 10 is a sectional view of the bracket body of the vehicle body-side bracket according to the second embodiment, and is a sectional view taken along a line X-X in FIG. 9.

As illustrated in FIG. 9 and FIG. 10, the bracket body 45 of this embodiment includes a link portion 102 provided between the rear wall 53 and a facing portion 101. The link portion 102 has a substantially L-shape in which the link portion 102 is bent forward from the rear wall 53 and then bent downward. The facing portion 101 is provided integrally with the distal end of a part of the link portion 102 that is bent downward. Clearances are secured in the vertical direction of the vehicle between the link portion 102 and the top plate 51 and between the link portion 102 and the facing portion 101. That is, in the bracket body 45 of this embodiment, the link portion 102 and the facing portion 101 are formed by bending a part of the rear wall 53 such that a portion including the top plate 51, the rear wall 53, the link portion 102, and the facing portion 101 has a substantial S-shape. The facing portion 101 of this embodiment has a flat-plate shape substantially parallel to the top plate 51.

This embodiment attains the following actions and effects in addition to actions and effects similar to the actions and effects (1) to (3) of the first embodiment. (6) The bracket body 45 includes the link portion 102 provided between the rear wall 53 and the facing portion 101 and bent so as to secure the clearances between the link portion 102 and the top plate 51 and between the link portion 102 and the facing portion 101. It is likely that the facing portion 101 is elastically displaced relative to the top plate 51. When the upper tube 22 strikes against the facing portion 101, an impact is mitigated through the elastic displacement of the facing portion 101. Thus, it is possible to reduce the occurrence of a case where the impact caused when the upper tube 22 strikes against the facing portion 101 is excessively large.

The embodiments described above may be modified as follows. The embodiments described above and modified examples described below may be combined without causing any technical contradiction. In the second embodiment, the link portion 102 has a substantially L-shape, but the shape may be changed as appropriate if the shape facilitates the elastic displacement of the facing portion 101 relative to the top plate 51. For example, the shape may be an S-shape in which the link portion 102 is folded a plurality of times.

In the first embodiment, the facing portion 91 may have a flat-plate shape substantially parallel to the top plate 51. In the second embodiment, the facing portion 101 may have a curved shape conforming to the outer peripheral surface of the upper tube 22.

In the first embodiment, the number of slits 93 to be provided in the facing portion 91 may be changed as appropriate. For example, one slit 93 may be provided alone. Further, the facing portion 91 need not have any slit 93. In the second embodiment, the facing portion 101 may have one or a plurality of slits 93.

In the embodiments described above, the cutout portions 92 are provided at the parts of the rear wall 53 on respective sides of the facing portion 91 or 101 in the width direction of the vehicle. The present disclosure is not limited to this case. The cutout portion 92 may be provided only on one side of the facing portion 91 or 101 in the width direction of the vehicle. Further, the rear wall 53 need not have any cutout portion 92.

In the embodiments described above, the facing portion 91 of the rear wall 53 that faces the upper tube 22 need not be bent so as to extend in the axial direction of the upper tube 22. The entire rear wall 53 including the part that faces the upper tube 22 may be shaped to extend in the vertical direction of the vehicle.

In the embodiments described above, the steering column apparatus 1 need not have the power assist function. Further, the steering column apparatus 1 need not have the tilt adjustment function.

What is claimed is:

1. A steering column apparatus comprising:
a column shaft to which a steering wheel is fixed at a rear end in a front-rear direction of a vehicle;
a column tube that supports the column shaft such that the column shaft is rotatable; and
an upper bracket that supports a rear part of the column tube, wherein
the column tube includes:
a lower tube; and
an upper tube fitted to the lower tube from a rear side in the vehicle front-rear direction of the vehicle,
the upper bracket includes:
a vehicle body-side bracket fixed to a vehicle body of the vehicle and including a pair of side plates spaced from each other in a width direction of the vehicle;
a tube-side bracket fixed to the upper tube and including a pair of side plates spaced from each other in the width direction of the vehicle; and
a support shaft arranged below the upper tube,
the vehicle body-side bracket has first coupling holes in the respective side plates of the vehicle body-side bracket,
the tube-side bracket has second coupling holes in the respective side plates of the tube-side bracket,
the first coupling holes and the second coupling holes are configured such that the vehicle body-side bracket and the tube-side bracket are coupled together by inserting the support shaft through the first coupling holes and the second coupling holes,
the support shaft is press-fitted into the second coupling holes with a predetermined press-fitting load to attach the support shaft to the tube-side bracket by the second coupling holes, and
each of the second coupling holes is open rearward and is configured such that, when an axial load equal to or greater than a predetermined load is applied to the upper tube, attachment between the second coupling hole and the support shaft is terminated by overcoming the predetermined press-fitting load, and the tube-side bracket moves forward.

2. The steering column apparatus according to claim 1, wherein:
the steering column apparatus is mounted on the vehicle in an inclined state such that a front end of the column tube is located below a rear end of the column tube;
the vehicle body-side bracket includes:
a top plate extending in the front-rear direction of the vehicle and in the width direction of the vehicle; and
a rear wall bent so as to extend downward from a rear end of the top plate; and
a facing portion bent so as to extend in an axial direction of the upper tube is provided at a part of the rear wall that faces the upper tube.

3. The steering column apparatus according to claim 2, wherein the vehicle body-side bracket has a cutout portion at a part of the rear wall that is adjacent to the facing portion in the width direction of the vehicle.

4. The steering column apparatus according to claim 2, wherein the vehicle body-side bracket has a slit in the facing portion, the slit extending in the axial direction of the upper tube.

5. The steering column apparatus according to claim 2, wherein the facing portion has a curved shape conforming to an outer peripheral surface of the upper tube.

6. The steering column apparatus according to claim 2, wherein:
the vehicle body-side bracket includes a link portion; and
the link portion is provided between the rear wall and the facing portion, and is configured such that a first clearance is present between the top plate and the link portion and a second clearance is present between the facing portion and the link portion.

7. The steering column apparatus according to claim 1, wherein the support shaft includes a pair of cylindrical collars that are press-fitted into the second coupling holes of the tube-side bracket.

8. The steering column apparatus according to claim 7, wherein each of the cylindrical collars includes a flange that is located between the respective side plates of the tube-side bracket when the cylindrical collars have been press-fitted into the second coupling holes so that the flanges face each other.

* * * * *